(12) United States Patent
Hagio et al.

(10) Patent No.: US 12,240,109 B2
(45) Date of Patent: Mar. 4, 2025

(54) METHOD OF CREATING CONTROL PROGRAM FOR ROBOT, SYSTEM EXECUTING PROCESSING OF CREATING CONTROL PROGRAM FOR ROBOT, AND NON-TRANSITORY COMPUTER-READABLE STORAGE MEDIUM

(71) Applicant: Seiko Epson Corporation, Tokyo (JP)

(72) Inventors: Masaaki Hagio, Matsumoto (JP); Yoshiki Nagashima, Shiojiri (JP)

(73) Assignee: SEIKO EPSON CORPORATION (JP)

( * ) Notice: Subject to any disclaimer, the term of this patent is extended or adjusted under 35 U.S.C. 154(b) by 326 days.

(21) Appl. No.: 17/578,517

(22) Filed: Jan. 19, 2022

(65) Prior Publication Data
US 2022/0226982 A1 Jul. 21, 2022

(30) Foreign Application Priority Data
Jan. 20, 2021 (JP) .................. 2021-006903

(51) Int. Cl.
*B25J 9/00* (2006.01)
*B25J 9/16* (2006.01)
*G05B 19/409* (2006.01)

(52) U.S. Cl.
CPC ........... *B25J 9/0081* (2013.01); *B25J 9/1671* (2013.01); *G05B 19/409* (2013.01); *G05B 2219/36162* (2013.01); *G05B 2219/39444* (2013.01)

(58) Field of Classification Search
CPC ...... B25J 9/0081; B25J 9/1671; B25J 9/1664; B25J 9/1602; B25J 9/161; B25J 19/023; B25J 9/1697; G05B 19/409; G05B 2219/36162; G05B 2219/39444; G05B 2219/36401; G05B 2219/36495; G05B 2219/39438; G05B 2219/39443; G05B 19/425; G05B 19/42; G05B 19/4202; G05B 2219/40099; G05B 2219/40392; G05B 2219/36017; G05B 2219/39449; G05B 2219/40394
See application file for complete search history.

(56) References Cited

U.S. PATENT DOCUMENTS

| | | | | |
|---|---|---|---|---|
| 5,937,143 | A | * | 8/1999 | Watanabe ............... B25J 9/1671 700/264 |
| 2002/0072826 | A1 | * | 6/2002 | Watanabe ............ G05B 19/409 700/264 |
| 2019/0299400 | A1 | * | 10/2019 | Nagashima ............... B25J 9/161 |
| 2020/0167886 | A1 | * | 5/2020 | Cho ...................... G06T 1/0014 |

FOREIGN PATENT DOCUMENTS

| | | |
|---|---|---|
| CN | 111225142 A | 6/2020 |
| JP | H09-085655 A | 3/1997 |

* cited by examiner

*Primary Examiner* — Bao Long T Nguyen
(74) *Attorney, Agent, or Firm* — Harness, Dickey & Pierce, P.L.C.

(57) ABSTRACT

A non-transitory computer-readable storage medium stores a computer program that controls a processor to execute (a) processing of displaying an operation window for operation of a position and an attitude of a control point for a robot arm, (b) processing of storing the position and the attitude of the control point as a teaching point according to an instruction of a user, and (c) processing of associating and storing the operation window when the instruction is received in the processing (b) with the teaching point.

9 Claims, 7 Drawing Sheets

METHOD OF CREATING CONTROL PROGRAM FOR ROBOT, SYSTEM EXECUTING PROCESSING OF CREATING CONTROL PROGRAM FOR ROBOT, AND NON-TRANSITORY COMPUTER-READABLE STORAGE MEDIUM

The present application is based on, and claims priority from JP Application Serial Number 2021-006903, filed Jan. 20, 2021, the disclosure of which is hereby incorporated by reference herein in its entirety.

BACKGROUND

1. Technical Field

The present disclosure relates to a method of creating a control program for a robot, a system executing processing of creating a control program for a robot, and a non-transitory computer-readable storage medium.

2. Related Art

JP-A-9-085655 discloses a technique of teaching a robot using a teaching operation console called a teaching pendant. The teaching operation console of the related art has a graphic display function and can graphically display a teaching point of a robot control program and a distal end portion of a robot arm.

However, in the related art, information used as criteria for setting the teaching point is not stored, and there is a problem that a determination as to whether or not the setting of the teaching point is appropriate is difficult for review of the teaching point.

SUMMARY

According to a first aspect of the present disclosure, a non-transitory computer-readable storage medium recording a computer program controlling a processor to execute processing of creating a control program for a robot is provided. The computer program controls the processor to execute (a) processing of displaying an operation window for operation of a position and an attitude of a control point for a robot arm, (b) processing of storing the position and the attitude of the control point as a teaching point according to an instruction of a user, and (c) processing of associating and storing the operation window when the instruction is received in the processing (b) with the teaching point stored according to the instruction.

According to a second aspect of the present disclosure, a method of creating a control program for a robot is provided. The method includes (a) displaying an operation window for operation of a position and an attitude of a control point for a robot arm, (b) storing the position and the attitude of the control point as a teaching point according to an instruction of a user, and (c) associating and storing the operation window when the instruction is received at (b) with the teaching point stored according to the instruction.

According to a third aspect of the present disclosure, a system executing processing of creating a control program for a robot is provided. The system includes a display unit that displays an operation window for operation of a position and an attitude of a control point for a robot arm, a memory unit that stores information on processing of creating the control program, and a control unit, and the control unit executes (a) processing of displaying the operation window on the display unit, (b) processing of storing the position and the attitude of the control point as a teaching point in the memory unit according to an instruction of a user, and (c) processing of associating and storing the operation window when the instruction is received in the processing (b) with the teaching point stored according to the instruction in the memory unit.

DESCRIPTION OF EXEMPLARY EMBODIMENTS

Figure 1:
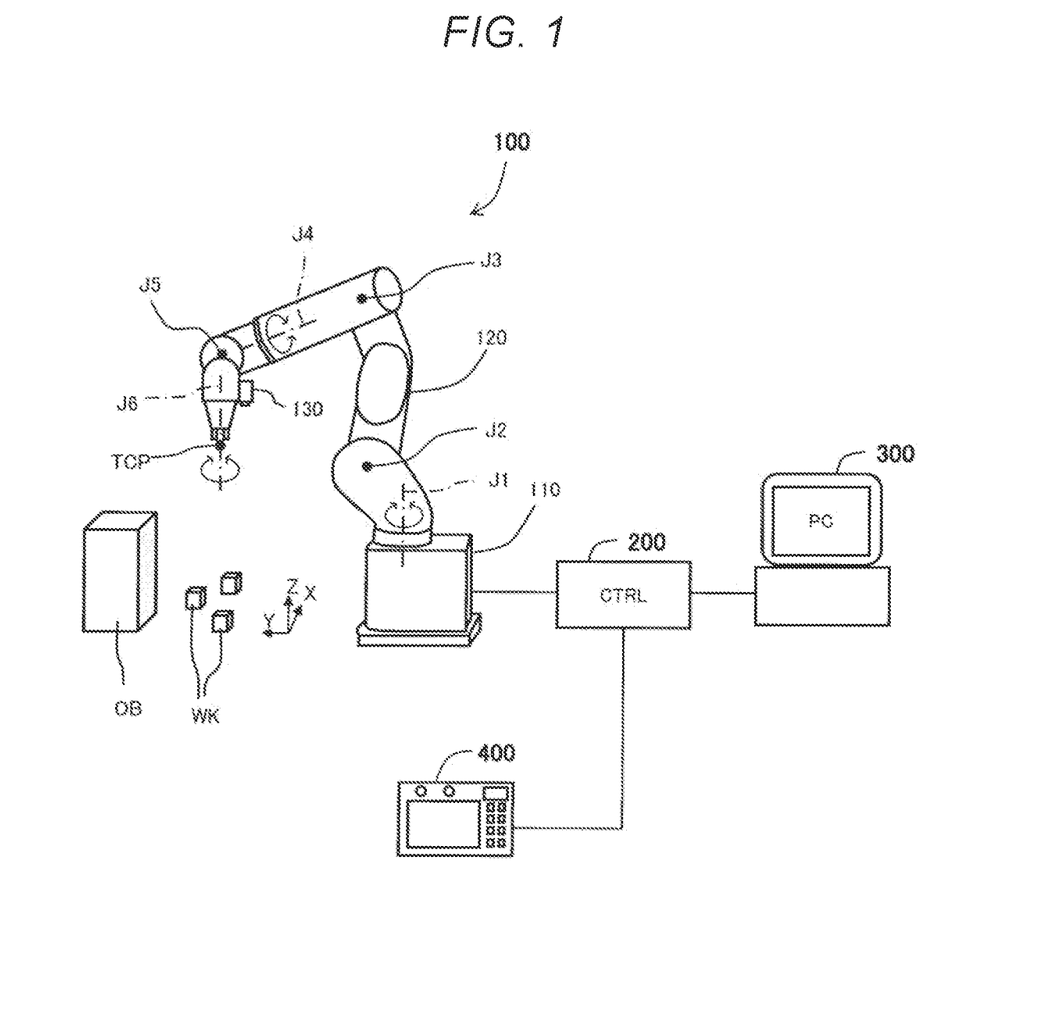
FIG. 1 is an explanatory diagram of a robot system in an embodiment.

FIG. 1 is an explanatory diagram showing a robot system in an embodiment. The robot system includes a robot 100, a control apparatus 200 that controls the robot 100, an information processing apparatus 300, and a teaching pendant 400. The information processing apparatus 300 is e.g. a personal computer. In FIG. 1, three axes X, Y, Z defining an orthogonal coordinate system in a three-dimensional space are drawn. The X-axis and the Y-axis are axes in horizontal directions and the Z-axis is an axis in vertical directions. In this example, the XYZ coordinate system is a robot coordinate system having the origin at a preset reference point for the robot 100.

The robot 100 includes a base 110 and a robot arm 120. The robot arm 120 is sequentially coupled by six joints J1 to J6. Of these joints J1 to J6, the three joints J1, J4, J6 are twisting joints and the other three joints J2, J3, J5 are bending joints. In the embodiment, a six-axis robot is exemplified, however, a robot including any robot arm mechanism having one or more joints can be used. The robot 100 of the embodiment is a vertical articulated robot, however, a horizontal articulated robot may be used.

A TCP (Tool Center Point) is set near the distal end portion of the robot arm 120 as a control point for the robot arm 120. The control point is a point as a reference for control of the robot arm. The TCP can be set in an arbitrary position. The control of the robot 100 refers to control of a position and an attitude of the TCP.

A camera 130 is attached to the distal end portion of the robot arm 120. The camera 130 is used for imaging of a work area of the robot 100 and recognition of workpieces WK and an object OB within the work area. Note that the camera 130 may be placed on a platform or a ceiling near the robot 100 instead of placement on the robot arm 120. Or, the camera 130 may be omitted. Generally, an imaging system for capturing images for work by a robot is called "robot vision".

Teaching processing for the robot 100 is performed using the information processing apparatus 300 or the teaching pendant 400. In the following embodiments, the teaching processing is performed using the information processing apparatus 300, however, the teaching pendant 400 may be used. Note that it is preferable that the teaching pendant 400 has a function of displaying a three-dimensional image of the robot 100 in an operation window thereof.

Figure 2:
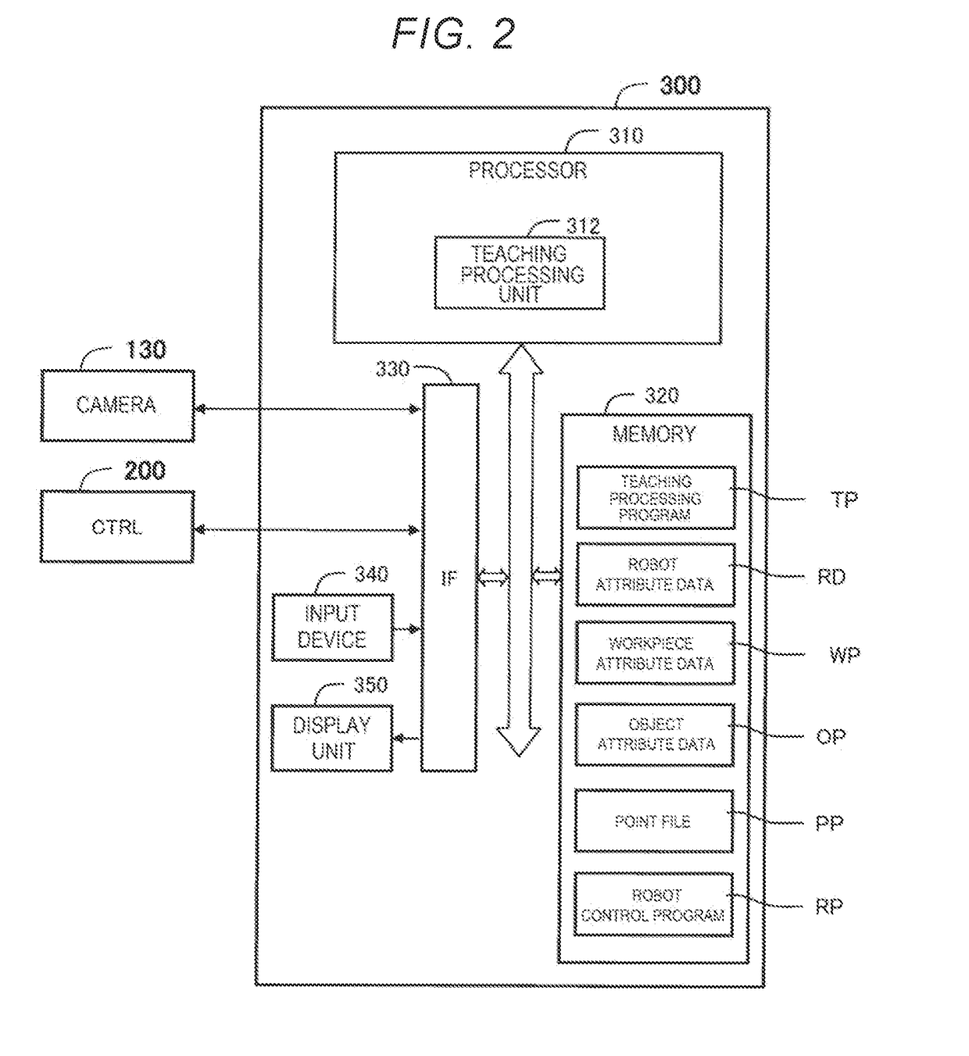
FIG. 2 is a functional block diagram of an information processing apparatus.

FIG. 2 is a block diagram showing functions of the information processing apparatus 300. The information processing apparatus 300 has a processor 310, a memory 320, an interface circuit 330, and an input device 340 and a display unit 350 coupled to the interface circuit 330. Further, the control apparatus 200 is coupled to the interface circuit 330. Note that the information processing apparatus 300 is not necessarily coupled to the control apparatus 200.

The processor 310 functions as a teaching processing unit 312 that executes teaching processing of the robot 100. The function of the teaching processing unit 312 is realized by the processor 310 executing a teaching processing program TP stored in the memory 320. Note that part or all of the functions of the teaching processing unit 312 may be realized by a hardware circuit. The processor 310 corresponds to "control unit" according to the present disclosure.

In the memory 320, robot attribute data RD, workpiece attribute data WD, object attribute data OD, a point file PP, and a robot control program RP are stored in addition to the teaching processing program TP. The robot attribute data RD contains various robot characteristics including the configuration and the movable range of the robot arm 120. The workpiece attribute data WD contains attributes of the workpieces WK including types and shapes of the workpieces WK as working objects of the robot 100. The object attribute data OD contains attributes such as a shape of the object OB in the work area of the robot 100. Note that the workpiece attribute data WD and the object attribute data OD can be omitted. The point file PP is a file in which information on teaching points used in the robot control program RP are registered. The robot control program RP includes a plurality of motion commands for moving the robot 100.

Figure 3:
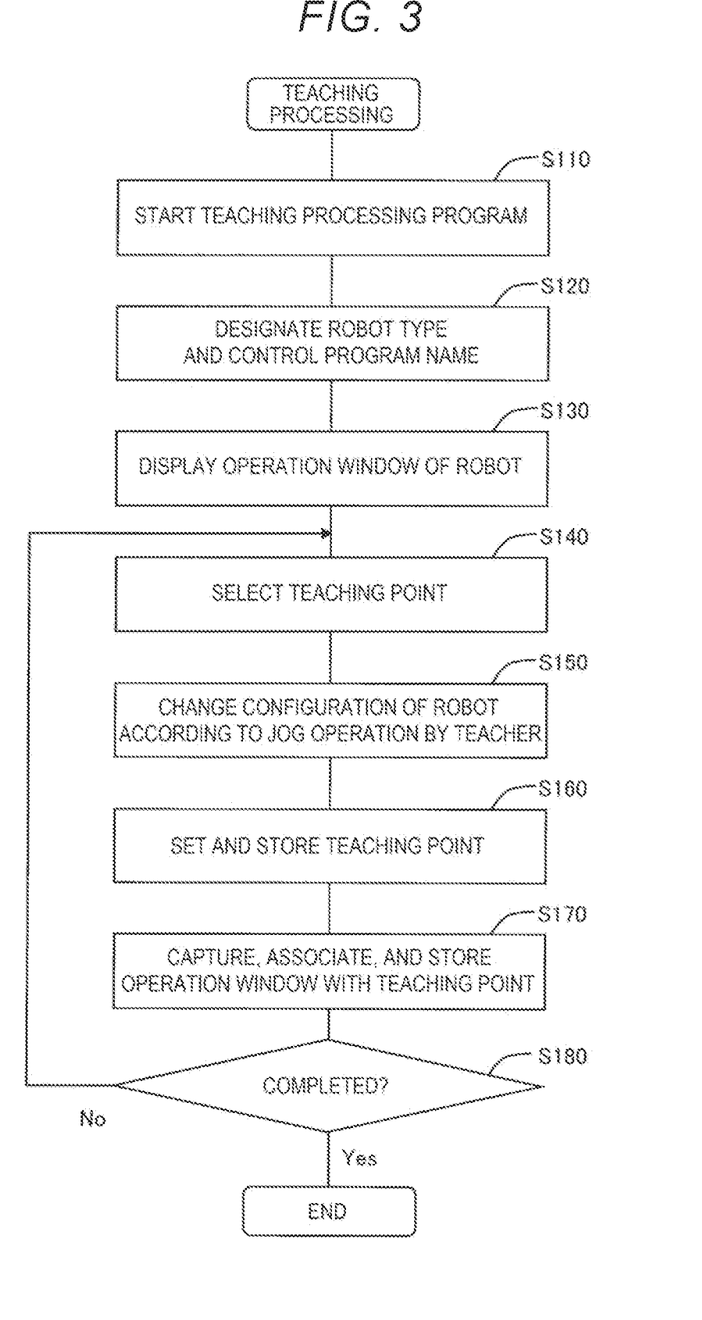
FIG. 3 is a flowchart showing a procedure of teaching processing.

FIG. 3 is a flowchart showing a procedure of the teaching processing in one embodiment. At step S110, a user starts the teaching processing program TP. In the present disclosure, the user is also referred to as "worker" or "teacher". At step S120, the user designates a robot type of a robot to be taught and a program name of a robot control program to be edited. At step S130, an operation window with respect to the robot of the designated type is displayed on the display unit 350. The operation window is a window for operation of the position and the attitude of the TCP of the robot arm 120.

Figure 4:
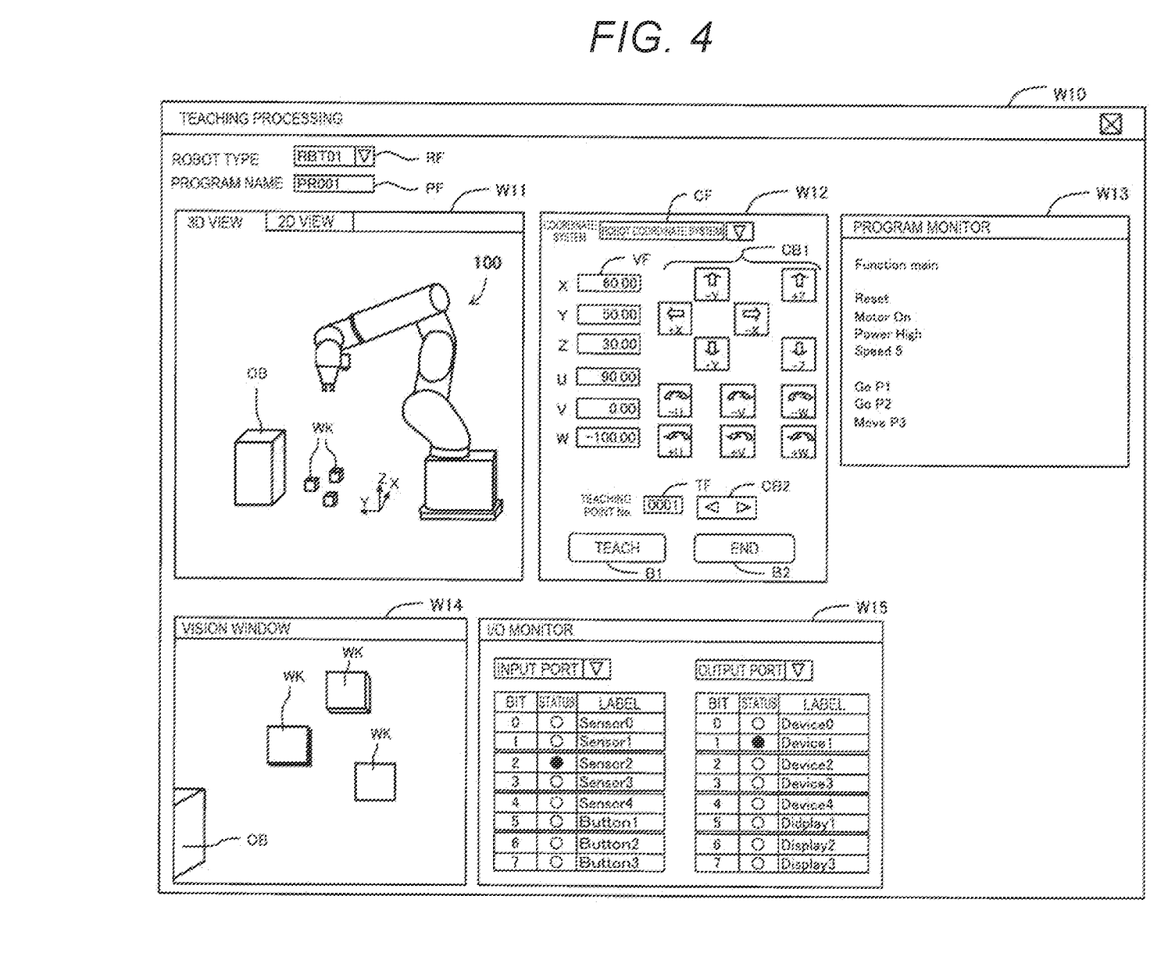
FIG. 4 is an explanatory diagram showing an example of an operation window for teaching processing.

FIG. 4 is an explanatory diagram showing an example of a teaching processing window W10 containing the operation window. The teaching processing window W10 contains a robot select field RF for selection of the robot type, a program select field PF for designation of the program name of the robot control program, a robot display window W11, a jog operation window W12, a program monitor W13, a vision window W14, and an I/O monitor W15. Of these windows, the robot display window W11, the jog operation window W12, the program monitor W13, the vision window W14, and the I/O monitor W15 correspond to the operation window.

The robot display window W11 is a window for displaying a simulation image of the robot 100. As the simulation image, one of a three-dimensional image or a two-dimensional image can be selectively displayed. When a three-dimensional image of the robot 100 is displayed, the user can arbitrarily change the direction of view and the display magnification of the image by operating a mouse within the robot display window W11. In the example of FIG. 4, a simulation image of the workpieces WK and the object OB in the work area of the real robot 100 are also displayed within the robot display window W11. Note that the display of the workpieces WK and the object OB may be omitted.

The jog operation window W12 is a window for the user to input a jog operation. The jog operation window W12 contains a coordinate system select field CF for selection of a coordinate system, coordinate value fields VF for designation of six coordinate values according to the selected coordinate system, a teaching point field TF for designation of a teaching point to be edited, a teaching point set button B1, and an end button B2. Increase and decrease buttons CB1 for increasing and decreasing coordinate values are placed on the right sides of the coordinate value fields VF. Increase and decrease buttons CB2 for increasing and decreasing the number of teaching points are placed on the right side of the teaching point field TF.

The coordinate system select field CF is a field for selection of arbitrary one of a robot coordinate system, a tool coordinate system, and a joint coordinate system. In the example of FIG. 4, the coordinate system select field CF is formed as a pull-down menu. The robot coordinate system and the tool coordinate system are orthogonal coordinate systems. When a jog operation is performed in the orthogonal coordinate system, joint coordinate values are calculated by inverse kinematics and a singular configuration is problematic. On the other hand, in the joint coordinate system, the calculation by inverse kinematics is unnecessary and the singular configuration is not problematic. Note that the singular configuration refers to a state in which an angle between axial lines of arbitrary two twisting joints is zero, and there is an advantage that a determination as to whether or not a configuration is close to the singular configuration is easier by display of coordinate values in the joint coordinate system.

The program monitor W13 is a window for displaying a robot control program to be created or edited. The user selects one of teaching points P1 to P3 displayed within the program monitor W13, and thereby, can select the teaching point as an object to be edited.

The vision window W14 is a window for displaying an image captured by the camera 130 as robot vision. In the vision window W14, at the time of teaching processing, an image captured by the camera 130 of the real robot 100 is displayed.

The I/O monitor W15 is a window for displaying I/O information representing input and output statuses in the control apparatus 200 of the robot 100 with respect to the teaching point to be edited. As the input statuses, presence or absence of signals input to the control apparatus 200 from various sensors, buttons to be pressed by the worker, etc. are displayed. As the output statuses, presence or absence of signals output from the control apparatus 200 to various peripheral devices is displayed. In the state of FIG. 4, input from "Sensor 2", output to "Device 1", and no other input or output are displayed. The I/O information is criteria for knowing work at the teaching point executed by the robot 100.

As the operation window, part of various kinds of information shown in FIG. 4 may be omitted. For example, the robot display window W11 may be omitted, however, there is an advantage that teaching work is easier by display of the position and the attitude of the robot arm 120 in the robot display window W11. Or, the vision window W14 may be omitted, however, the vision window W14 is displayed, and thereby, a view of the robot vision including the field of view and the focus may be determined. Or, the I/O monitor W15 may be omitted, however, the I/O monitor W15 is displayed, and thereby, the work executed by the robot 100 may be determined from the input and output statuses in the control apparatus 200 of the robot 100.

At step S140 in FIG. 3, the teaching point is selected by the user. The selection of the teaching point is performed by e.g. setting of the value of the teaching point field TF. At step S150, the configuration of the robot 100 is changed according to a jog operation by the user in the jog operation window W12. "Configuration of robot 100" refers to the position and the attitude of the TCP. At step S160, the teaching point is set and stored. The setting of the teaching point is executed by the user pressing the teaching point set button B1. Coordinate values indicating the position and the attitude of the TCP at the set teaching point are stored in the memory 320. Specifically, information on the set teaching point is registered in the point file PP for the robot control program RP. At step S170, the teaching processing unit 312 captures the operation window at the time when receiving an instruction to set the teaching point and associates and stores the captured image with the teaching point in the memory 320. The association between the captured image and the teaching point is registered in the point file PP.

Figure 5:
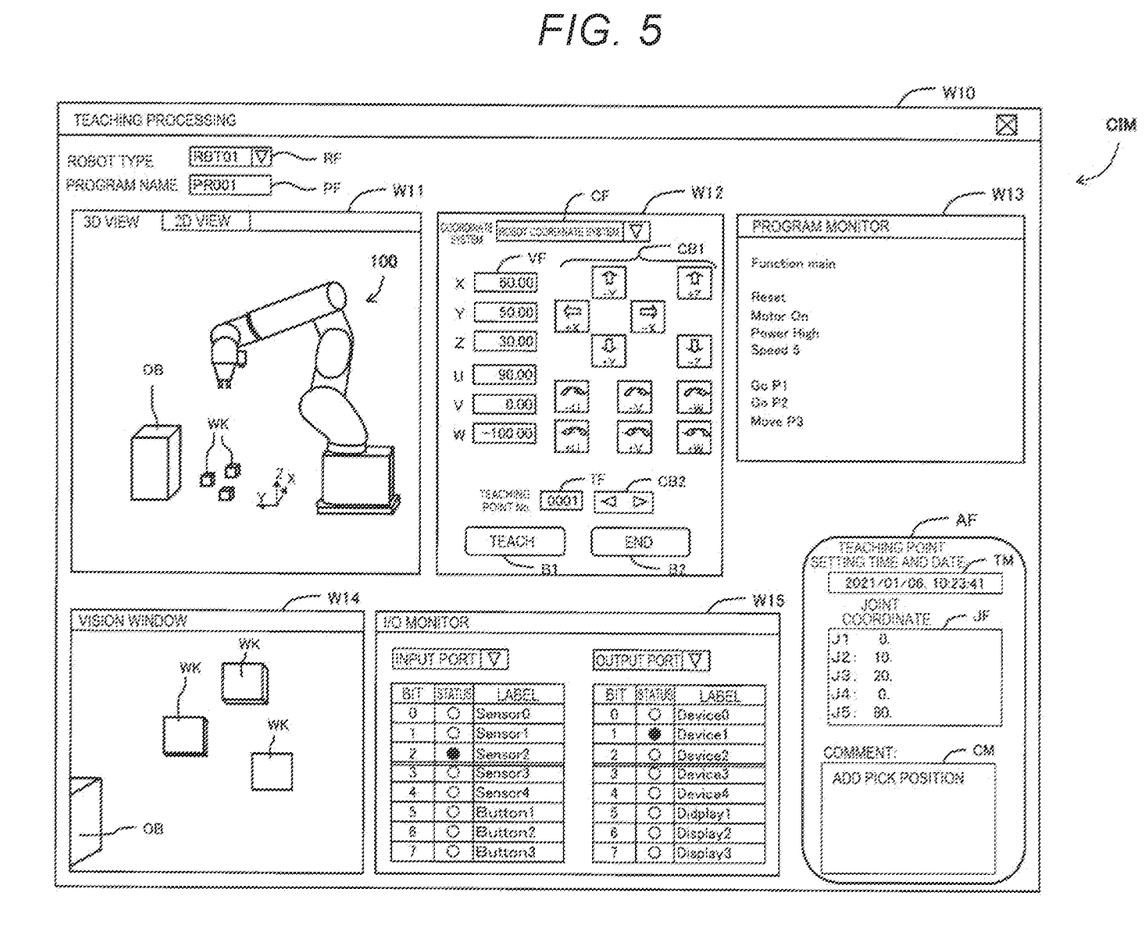
FIG. 5 is an explanatory diagram showing an example of a captured image captured when a teaching point is stored.

FIG. 5 is an explanatory diagram showing an example of a captured image CIM captured when a teaching point is stored. The captured image CIM is substantially the same as the teaching processing window W10 shown in FIG. 4 and further contains additional information AF. The additional information AF contains time information TM representing a time and date when the teaching point is stored, joint coordinate information JF representing coordinate values of the joint coordinate system, and a comment field CM. When the coordinate system used for the jog operation is an orthogonal coordinate system, the joint coordinate information JF is generated by conversion of the coordinate values of the orthogonal coordinate system into coordinate values of the joint coordinate system. In the comment field CM, the user setting the teaching point may freely write a comment as a note. Note that, when the teaching point is stored, first, the comment field CM in blank is displayed in the window and, after the user fills the field, stored in the memory 320 as a part of the captured image CIM.

Note that the additional information AF of the captured image CIM may be omitted. When the captured image CIM contains the time information TM, the time and date when the teaching point was set is known for review of the teaching point, and the time information may be used as criteria for determination of the situation where the teaching point is set. Further, when the captured image CIM contains the joint coordinate information JF, for review of the teaching point, whether or not the robot arm is close to the singular configuration may be determined from the coordinate values of the joint coordinate system of the robot arm. Furthermore, when the captured image CIM contains the comment field CM, for review of the teaching point, the intension of the user for setting of the teaching point is known, and the intention may be used as criteria for determination of the situation.

Further, a three-dimensional image at an automatically selected viewpoint at which the robot arm 120 and the object OB as an obstacle appear as many as possible may be added to the captured image CIM of the operation window. The processing of creating the additional three-dimensional image can be executed by e.g. image processing using pattern matching. Specifically, the three-dimensional image of the robot arm 120 is stored as a template in the memory 320 in advance and the magnification of the image within the robot display window W11 is changed so that the degree of coincidence with the template may be higher, and thereby, the additional three-dimensional image may be created. The three-dimensional image is added to the captured image CIM, and thereby, there is an advantage that the state of the robot arm 120 at the time when the teaching point is set is easily understood from the captured image CIM.

At step S180, whether or not the teaching processing is completed is determined by the user. When the teaching processing is not completed, the process returns to step S140 and the above described steps S140 to S180 are repeated. On the other hand, when the teaching processing is completed, the teaching processing in FIG. 3 is ended by the user pressing the end button B2.

Figure 6:
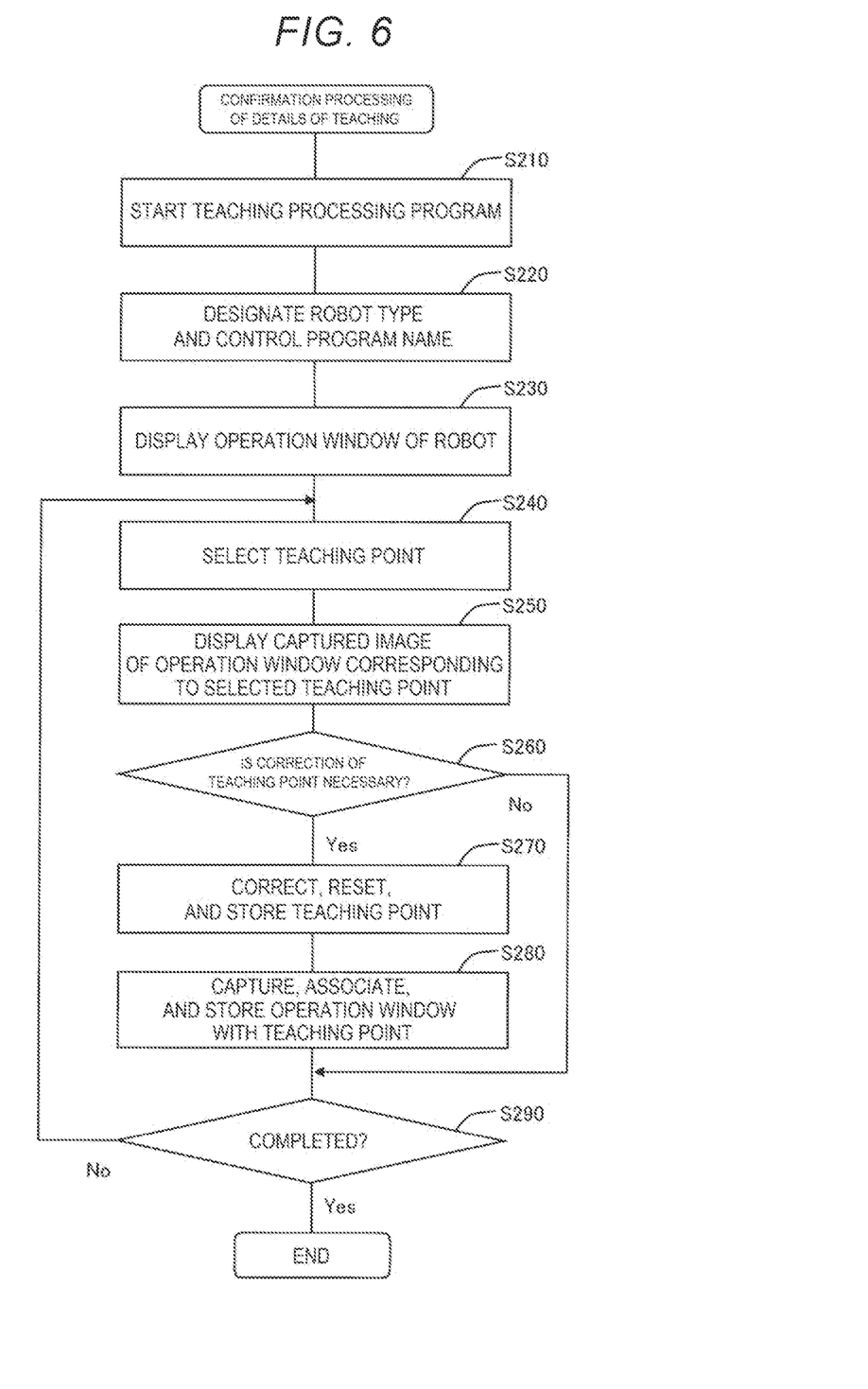
FIG. 6 is a flowchart showing a procedure of confirmation processing of details of teaching.

FIG. 6 is a flowchart showing a procedure of confirmation processing of details of teaching. Steps S210 to S230 are the same as steps S110 to S130 in FIG. 3. That is, at step S210, the user starts the teaching processing program TP. At step S220, the user designates a robot type of a robot to be taught and a program name of a robot control program to be edited. At step S230, an operation window with respect to the robot of the designated type is displayed on the display unit 350.

At step S240, a teaching point to be reviewed is selected by the user. The selection of the teaching point here can be performed using e.g. a teaching point list in which a plurality of teaching points registered in the point file PP for the robot control program RP are listed. At step S250, the teaching processing unit 312 displays a captured image of the operation window corresponding to the selected teaching point on the display unit 350.

Figure 7:
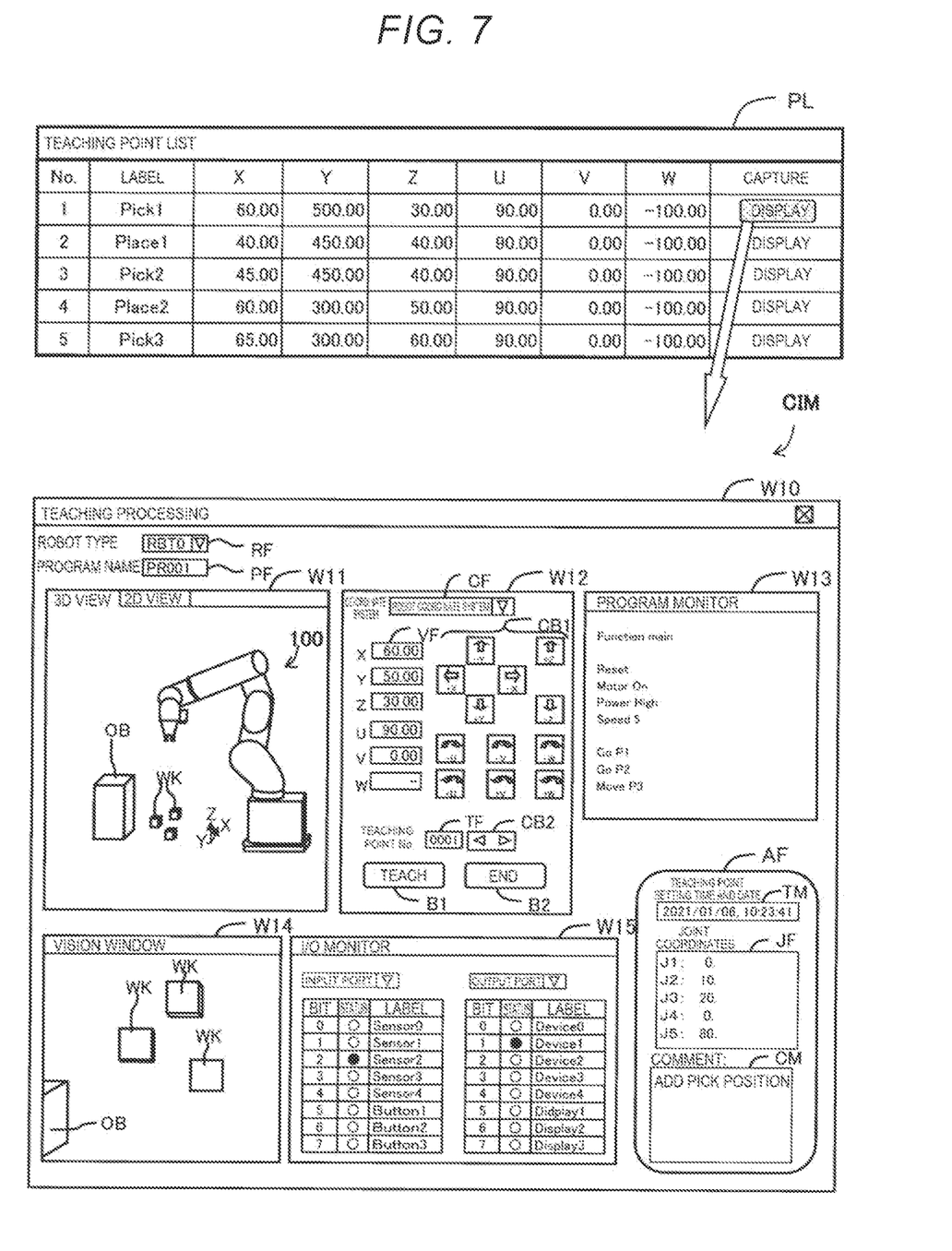
FIG. 7 is an explanatory diagram showing display of a captured image of an operation window associated with a teaching point.

FIG. 7 is an explanatory diagram showing display of a captured image CIM of an operation window associated with a teaching point. The teaching point list PL is displayed in the upper part of FIG. 7. The teaching point list PL is a list in which a plurality of teaching points registered in the point file PP are listed. The teaching point list PL contains a teaching point number, a label, coordinate values, and a captured image display button with respect to each teaching point. The label is a name showing work performed at a teaching point.

When the user presses the captured image display button of one teaching point within the teaching point list PL, as shown in the lower part of FIG. 7, a captured image CIM associated with the teaching point is displayed on the display unit 350. The captured image CIM is the same as that shown in FIG. 6.

At step S260 in FIG. 6, the user determines whether or not correction of the teaching point is necessary. When the correction of the teaching point is not necessary, the processing in FIG. 6 is ended. On the other hand, when the correction of the teaching point is necessary, the process goes to step S270 and the user executes correction and resetting of the teaching point using the operation window explained in FIG. 4. The correction of the teaching point refers to correction of coordinate values of the teaching point. When the teaching point is corrected, the corrected teaching point is stored in the memory 320. Specifically, information on the teaching point reset after correction is registered in the point file PP for the robot control program RP. At step S280, the teaching processing unit 312 captures the operation window at the time when receiving an instruction to reset the teaching point and associates and stores the captured image with the teaching point in the memory 320. Note that the processing at steps S270, S280 is substantially the same as the processing at steps S160, S170 in FIG. 3.

Note that, when the teaching point is corrected and reset, it is preferable to also store the captured image created when the teaching point was first set as it is with the captured image of the operation window created at step S280 in the memory 320. As described above, it is preferable to store a plurality of captured images with respect to the same teaching point created at the first setting and the subsequent resetting in the memory 320. In this case, the captured image list in which the plurality of captured images associated with the same teaching point are selectively arranged on a time-series basis may be presented on the window and the user may arbitrarily select and display the captured image. In this manner, the operation windows at a plurality of times of setting may be reproduced with respect to the teaching point, and whether or not the teaching point is appropriate may be determined more easily.

At step S290, whether or not the confirmation processing of the teaching point is completed is determined by the user. When the confirmation processing is not completed, the process returns to step S240 and the above described steps S240 to S290 are repeated. On the other hand, when the confirmation processing is completed, the user ends the processing in FIG. 6.

As described above, in the above described embodiment, the operation window of the robot arm at the time when the user sets the teaching point is stored, and thereby, the operation window may be reproduced when the teaching point is reviewed and may be used as reference information for determination as to whether or not the teaching point is appropriate.

Other Embodiments

The present disclosure is not limited to the above described embodiments, but may be realized in various aspects without departing from the scope thereof. For example, the present disclosure can be realized in the following aspects. The technical features in the above described embodiments corresponding to the technical features in the following respective aspects can be appropriately replaced or combined to solve part or all of the problems of the present disclosure or achieve part or all of the effects of the present disclosure. The technical features not described as essential features in this specification can be appropriately deleted.

(1) According to a first aspect of the present disclosure, a non-transitory computer-readable storage medium storing a computer program controlling a processor to execute processing of creating a control program for a robot is provided. The computer program controls the processor to execute (a) processing of displaying an operation window for operation of a position and an attitude of a TCP as a control point for a robot arm, (b) processing of storing the position and the attitude of the TCP as a teaching point according to an instruction of a user, and (c) processing of associating and storing the operation window when the instruction is received in the processing (b) with the teaching point stored according to the instruction.

According to the computer program, the operation window of the robot arm when the user sets the teaching point is stored, and thereby, the operation window may be reproduced when the teaching point is reviewed and may be used as reference information for determination as to whether or not the teaching point is appropriate.

(2) The above described computer program may control the processor to further execute (d) processing of displaying the operation window corresponding to the teaching point according to designation of the teaching point received from the user after the processing (c).

According to the computer program, when the teaching point is reviewed, the corresponding operation window may be used as reference information.

(3) In the above described computer program, the operation window may contain a three-dimensional image of the robot arm.

According to the computer program, the position and the attitude of the robot arm may be reproduced when the teaching point is reviewed, and thereby, whether or not the teaching point is appropriate may be determined based on presence or absence of a singular configuration.

(4) In the above described computer program, the operation window may contain time information representing a time and date when the teaching point is stored.

According to the computer program, when the teaching point is reviewed, the time and date when the teaching point is set is known and may be used as criteria for determination of the situation where the teaching point is set.

(5) In the above described computer program, the operation window may contain an image captured by robot vision.

According to the computer program, whether or not the teaching point is appropriate may be determined based on a view of the robot vision including the field of view and the focus.

(6) In the above described computer program, the operation window may contain coordinate values of a joint coordinate system of the robot arm.

According to the computer program, when the teaching point is reviewed, whether or not the robot arm is close to a singular configuration may be determined from the coordinate values of the joint coordinate system of the robot arm.

(7) In the above described computer program, the operation window may contain I/O information representing input and output statuses in a control apparatus of the robot.

According to the computer program, when the teaching point is reviewed, work executed by the robot may be determined from the input and output statuses in the control apparatus of the robot.

(8) According to a second embodiment of the present disclosure, a method of creating a control program for a robot is provided. The method includes (a) displaying an operation window for operation of a position and an attitude of a TCP as a control point for a robot arm, (b) storing the position and the attitude of the TCP as a teaching point according to an instruction of a user, and (c) associating and storing the operation window when the instruction is received at (b) with the teaching point stored according to the instruction.

According to the method, the operation window of the robot arm used as criteria when the user sets the teaching point is stored, and thereby, the operation window may be reproduced when the teaching point is reviewed and may be used as reference information for determination as to whether or not the teaching point is appropriate.

(9) According to a third aspect of the present disclosure, a system executing processing of creating a control program for a robot is provided. The system includes a display unit that displays an operation window for operation of a position and an attitude of a control point for a robot arm, a memory unit that stores information on processing of creating the control program, and a control unit, and the control unit executes (a) processing of displaying the operation window on the display unit, (b) processing of storing the position and the attitude of the TCP as a teaching point in the memory unit according to an instruction of a user, and (c) processing of associating and storing the operation window when the instruction is received in the processing (b) with the teaching point stored according to the instruction in the memory unit.

According to the system, the operation window of the robot arm used as criteria when the user sets the teaching point is stored, and thereby, the operation window may be reproduced when the teaching point is reviewed and may be used as reference information for determination as to whether or not the teaching point is appropriate.

The present disclosure can be realized in other various aspects than those described as above. For example, the present disclosure may be realized in aspects of a robot system including a robot and a robot control apparatus, a computer program for realizing functions of the robot control apparatus, a non-transitory storage medium in which the computer program is recorded, etc.

What is claimed is:

1. A method of creating a control program for a robot, comprising:
   displaying an operation window for an operation of a position and an attitude of a control point for a robot arm;
   storing the position and the attitude of the control point as a teaching point according to an instruction of a user;
   capturing the operation window containing at least time information representing a time and date when the teaching point is stored in response to the instruction of the user;
   associating and storing the captured operation window with the teaching point in response to the instruction of the user; and
   displaying the captured operation window containing at least the time information on a display in response to designation of the user,
   wherein the operation window contains input and output information representing a plurality of input statuses and a plurality of output statuses in a control apparatus of the robot,
   the plurality of input statuses show presence or absence of a signal input to the control apparatus from each of a plurality of sensors and a plurality of peripheral devices, and
   the plurality of output statuses show presence or absence of a signal output from the control apparatus to the each of the plurality of sensors and the plurality of peripheral devices.

2. The method according to claim 1, wherein the operation window contains a three-dimensional image of the robot arm.

3. The method according to claim 1, wherein the operation window contains an image captured by robot vision.

4. The method according to claim 1, wherein the operation window contains coordinate values of a joint coordinate system of the robot arm.

5. The method according to claim 1, wherein the operation window contains control program information representing a created version or an edited version of the control program of the robot.

6. A system executing processing of creating a control program for a robot, comprising:
   a display configured to display an operation window for an operation of a position and an attitude of a control point for a robot arm;
   a memory configured to store a program and information on processing of creating the control program; and
   a processor configured to execute the program so as to:
   display the operation window on the display;
   store the position and the attitude of the control point as a teaching point in the memory according to an instruction of a user;
   capture the operation window containing at least time information representing a time and date when the teaching point is stored in response to the instruction of the user;
   associate and store the captured operation window with the teaching point in response to the instruction of the user in the memory; and
   display the captured operation window containing at least the time information on the display in response to designation of the user,
   wherein the operation window contains input and output information representing a plurality of input statuses and a plurality of output statuses in a control apparatus of the robot,
   the plurality of input statuses show presence or absence of a signal input to the control apparatus from each of a plurality of sensors and a plurality of peripheral devices, and
   the plurality of output statuses show presence or absence of a signal output from the control apparatus to the each of the plurality of sensors and the plurality of peripheral devices.

7. The system according to claim 6, wherein the operation window contains control program information representing a created version or an edited version of the control program of the robot.

8. A non-transitory computer-readable storage medium recording a computer program for causing a computer to execute a process by a processor so as to perform the steps of:
   displaying an operation window for an operation of a position and an attitude of a control point for a robot arm;
   storing the position and the attitude of the control point as a teaching point according to an instruction of a user;
   capturing the operation window containing at least time information representing a time and date when the teaching point is stored in response to the instruction of the user;
   associating and storing the captured operation window with the teaching point in response to the instruction of the user; and
   displaying the captured operation window containing at least the time information on a display in response to designation of the user,
   wherein the operation window contains input and output information representing a plurality of input statuses and a plurality of output statuses in a control apparatus of the robot,
   the plurality of input statuses show presence or absence of a signal input to the control apparatus from each of a plurality of sensors and a plurality of peripheral devices, and
   the plurality of output statuses show presence or absence of a signal output from the control apparatus to the each of the plurality of sensors and the plurality of peripheral devices.

9. The non-transitory computer-readable storage medium according to claim 8, wherein the operation window contains control program information representing a created version or an edited version of the control program of the robot.

* * * * *